(12) United States Patent
Orfanos et al.

(10) Patent No.: US 8,170,052 B2
(45) Date of Patent: May 1, 2012

(54) METHOD OF OPERATING A NETWORK NODE OF A NETWORK, A NETWORK NODE, A NETWORK SYSTEM, A COMPUTER-READABLE MEDIUM, AND A PROGRAM ELEMENT

(75) Inventors: Georgios Orfanos, Aachen (DE); Francesc Dalmases, Bellaterra-Barcelona (ES); Joerg Habetha, Aachen (DE); Begonya Otal, Aachen (DE); Peter May, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 553 days.

(21) Appl. No.: 11/577,815

(22) PCT Filed: Oct. 25, 2005

(86) PCT No.: PCT/IB2005/053487
§ 371 (c)(1),
(2), (4) Date: Apr. 9, 2008

(87) PCT Pub. No.: WO2006/046201
PCT Pub. Date: May 4, 2006

(65) Prior Publication Data
US 2008/0273549 A1    Nov. 6, 2008

(30) Foreign Application Priority Data
Oct. 29, 2004    (EP) .................................... 04105409

(51) Int. Cl.
*H04L 12/43* (2006.01)

(52) U.S. Cl. ....................................... 370/461; 370/431
(58) Field of Classification Search .................. 370/400, 370/389, 431, 436, 437, 439, 445, 442, 441, 370/448, 447, 450, 456, 458, 461, 462, 464, 370/459, 457, 453
See application file for complete search history.

(56) References Cited

U.S. PATENT DOCUMENTS

| 4,809,362 A | * | 2/1989 | Claus et al. ..................... 398/61 |
| 5,774,468 A | | 6/1998 | Maruyama et al. |

(Continued)

FOREIGN PATENT DOCUMENTS
WO    0205490    1/2002
(Continued)

OTHER PUBLICATIONS

"IEEE P802.11G Wireless LAN Medium Access" LAN MAN Standards Committee of the IEEE Computer Society, Standard 802.11, 1999 Edition.

*Primary Examiner* — Brenda H Pham
(74) *Attorney, Agent, or Firm* — Larry Liberchuk (57) ABSTRACT

A method of operating a network node of a network, a network node, a network system, a computer-readable medium, and a program element A method (300) of operating a network node (101-104) of a network system (100), comprising the steps of generating (305) a signal to be transmitted, selecting (310) one of a plurality of communication channels (105-108) of the network system (100) for transmitting the signal, and, in case that the selected channel (105-108) is not ready for transmitting the signal, selecting (345) another one of the plurality of communication channels (105-108) for transmitting the signal.

26 Claims, 3 Drawing Sheets

U.S. PATENT DOCUMENTS

| | | | |
|---|---|---|---|
| 5,889,772 | A | 3/1999 | Fischer et al. |
| 6,349,210 | B1 | 2/2002 | Li |
| 6,393,032 | B1 | 5/2002 | Ikegami |
| 6,628,639 | B1 * | 9/2003 | Ishii .............................. 370/346 |
| 2002/0071448 | A1 | 6/2002 | Cervello et al. |
| 2002/0172186 | A1 | 11/2002 | Larsson |
| 2002/0188723 | A1 | 12/2002 | Choi et al. |
| 2003/0219001 | A1 | 11/2003 | de Prado Pavon et al. |
| 2004/0029590 | A1 | 2/2004 | Wentink |
| 2006/0083166 | A9 * | 4/2006 | Janczak ....................... 370/230 |

FOREIGN PATENT DOCUMENTS

| | | |
|---|---|---|
| WO | 03026221 A1 | 3/2003 |
| WO | 2005064869 | 7/2005 |

* cited by examiner

METHOD OF OPERATING A NETWORK NODE OF A NETWORK, A NETWORK NODE, A NETWORK SYSTEM, A COMPUTER-READABLE MEDIUM, AND A PROGRAM ELEMENT

The invention relates to the field of networks. In particular, the invention relates to a method of operating a network node of a network, to a network node, to a network system, to a computer-readable medium, and to a program element.

A WLAN ("Wireless Local Area Network") is a local network of a plurality of network nodes communicating in a wireless manner. A WLAN may be implemented in the frame of the standard IEEE 802.11 (see LAN MAN Standards Committee of the IEEE Computer Society, Wireless LAN Medium Access Control (MAN) and Physical Layer (PHY) specifications, IEEE Standard 802.11, 1999 Edition).

IEEE 802.11 is a worldwide standard for Wireless Local Area Networks (WLANs) constantly improving in order to cope with the raising demands of users and applications for higher throughput and Quality of Service (QoS).

In a WLAN, two different network nodes may exchange data according to an implemented communication scheme. Before a data transmission between two such network nodes starts, a handshake between a sender node and a receiver node may take place, so that the medium can be reserved for the subsequent transmission of data and the transmission will be protected from collisions with data packets from other network nodes (terminals) transmitting at the same time. Such a handshake may include the transmission of a so-called Ready to Send (RTS) signal which a network node sends to another network node when it is ready to send data to the other network node. A potential receiver of data may send a Clear to Send (CTS) signal when it is ready to receive data.

Sending an RTS packet and an CTS packet is a precaution for the data transfer and may avoid undesired collisions of data. However, the RTS and CTS packets are only protected through the Carrier Sense Multiple Access/Collision Avoidance (CSMA/CA) multiple access protocol of the IEEE 802.11 Standard. The CSMA/CA is a collision avoidance method which may be implemented in a WLAN. The CSMA/CA method includes a so-called Inter Frame Space (IFS) for a priority dependent access with a collision avoidance function. According to CSMA/CA, the medium is intercepted, and if the medium is free for the duration of an IFS, data will be sent. If the medium is busy, the method waits for a free IFS and, in order to avoid a collision, delays the transmission for a random Backoff time.

According to IEEE 802.11 data packets can be sent with or without prior RTS/CTS handshake. If no prior handshake is carried out, data packets may collide instead of the RTS or CTS packets. The advantage of RTS/CTS frames is that they are relatively short, which results in a corresponding short collision time on the medium. Data packets may be relatively long compared to RTS/CTS packets, and may result in long collision times. However, the use of the RTS/CTS handshake may not be useful below a certain data packet size, because no reduction in collision time would be observed. Therefore the use of RTS/CTS is often dependent on the data frame size. In later revisions of 802.11 there may be other reasons (beside the reduction of the collision time) to carry out a handshake before the data transmission (e.g. for negotiation or training purposes). The handshake messages may not necessarily be called RTS and CTS. The handshake may not necessarily be a two way handshake (could also be one-way, three-way, etc.).

As a result of collisions and/or busy medium, large delay times for terminals intending to transmit data and lower throughput through the repetitive request for retransmission of an RTS (with usage of RTS/CTS) or DATA frame (without usage of RTS/CTS) are observed.

U.S. Pat. No. 6,393,032 B1 discloses a wireless LAN system including a wireless terminal transmitting/receiving an RTS frame/a CTS frame and subsequently transmitting/receiving a data frame. The RTS frame/CTS frame is transmitted at a different data transfer rate than the transmission of the data. Further, different modems may be used to transmit the RTS frame/CTS frame on the one hand and the data frame on the other hand. However, the network according to U.S. Pat. No. 6,393,032 B1 is very slow in the case of a collision.

US 2002/0172186 A1 discloses an RTS/CTS channel access scheme in which control frames RTS and CTS may be sent over a channel which differs from a channel over which data packets are transmitted. However, the system according to US 2002/0172186 A1 suffers from long delays in case of a collision.

It is an object of the invention to enable a communication scheme between network nodes of a network system in such a manner that even in occurrence of a collision, a high transmission rate can be achieved.

In order to achieve the object defined above, a method of operating a network node of a network, a network node, a network system, a computer-readable medium, and a program element with the features according to the independent claims are provided.

The method of operating a network node of a network system comprises the steps of generating a signal to be transmitted, selecting one of a plurality of communication channels of the network system for transmitting the signal, and, in case that the selected channel is not ready for transmitting the signal, selecting another one of the plurality of communication channels for transmitting the signal.

Beyond this, a network node is provided comprising a processor adapted to carry out the above mentioned method steps.

Further, a network system is provided comprising a plurality of interconnected network nodes with the above mentioned features.

The invention further provides a computer-readable medium, in which a computer program of operating a network node of a network system is stored which, when being executed by a processor, is adapted to carry out the method steps according to the above mentioned method.

Beyond this, a program element of operating a network node of a network system is provided, which, when being executed by a processor, is adapted to carry out the method steps according to the above mentioned method.

The operation of the network node according to the invention can be realized by a computer program, i.e. by software, or by using one or more special electronic optimization circuits, i.e. in hardware, or in hybrid form, i.e. by means of software components and hardware components.

The characteristic features according to the invention have particularly the advantage that a particular channel from a plurality of channels is selected for the transmission of a signal, and in case that it is determined that the selected channel is busy and thus not ready for transmitting the signal, the channel chosen for transmitting the signal is changed. Accordingly, traffic may be flexibly rerouted to a channel which is presently unoccupied, increasing the efficiency of transmitting traffic in a multichannel network and increasing the speed of processing traffic. Therefore, in case of a collision of a signal to be transmitted via a selected channel with any other signal to be transmitted via the same channel, the invention provides the opportunity to invade to another free channel to promptly transmit the signal. This ensures, even in a scenario of a collision of the signal to be transmitted, that the transmission rate is high, since free resources are used at maximum capacity.

Selecting one channel from a plurality of channels includes selecting exactly one or more than one channel from the plurality of channels.

The information that the selected channel is not ready for transmitting the signal can result after an attempt to transmit which led to a collision, or because call admission control did not allow a further connection.

Particularly, the invention provides a communication protocol allowing to improve a handshake scheme. Such a handshake between a sender node and a receiver node of a network may include the transmission of a Ready to Send (RTS) signal, and of a Clear to Send (CTS) signal, respectively. Such a handshake signal may precede an actual data signal indicating emerging traffic, signalizing the intention to subsequently send or receive a data signal.

If such an RTS signal or a CTS signal is sent and collides with other traffic on a channel of a multichannel system, this collision is detected and the RTS signal or CTS signal is re-transmitted with a certain probability on another channel than beforehand. However, according to another probability, the system may wait for a predetermined or a random time, and afterwards the system tries to repeat the transmission over the same channel.

Thus, one aspect of the invention relates to an efficient mechanism to improve the performance of the handshake procedure in a communication network, yielding a more efficient use of the transmission channels, thus achieving a higher throughput.

The communication protocol of the present invention does not only improve data exchanges with a handshaking scheme but also data exchanges without prior signalling handshake. If DATA packets have not been successfully transmitted (e.g. due to a collision), the DATA packet may be re-transmitted with a certain probability on a different channel (or on the same channel).

The invention particularly applies to multichannel/multi-band systems using a Ready to Send (RTS)/Clear to Send (CTS) or similar handshake to signal an emerging data transfer and reserve the medium for that time period as well as to multichannel systems that do not use a handshake prior to the data transmission, by proposing—at least with a probability which is larger than zero—a retransmission of the RTS (case with handshake) or DATA (case without handshake) packet on another channel. Advantageously, the retransmission scheme may be applied in the framework of the IEEE 802.11 WLAN Standard, in all its variations specified by the numerous Task Groups.

According to the related art, the RTS/CTS (case with handshake) and DATA (case without handshake) packets are only protected by Carrier Sense Multiple Access/Collision Avoidance (CSMA/CA), resulting in delays due to repetitive request for retransmission of a handshake signal or DATA frame. According to the invention, such delays are avoided by trying to retransmit the handshake signal (e.g. an RTS packet) or DATA frame on a different channel, at least with a certain probability.

The relates to any system that used CSMA as the channel access scheme, but beside IEEE 802.11 specifically also a Wireless Personal Area Network (WPAN) according to the Multi-Band OFDM Alliance (MBOA) Medium Access Control specification.

One aspect of the invention is directed to an IEEE 802.11 WLAN or MBOA WPAN working with multiple channels separated from each other with codes, particularly using Multi-Carrier Code Division Multiple Access (MC-CDMA), Direct Sequence Spread Spectrum or Frequency Hopping as multiple access.

Another aspect of the invention is directed to an IEEE 802.11 WLAN or MBOA WPAN terminal performing a channel change after collision.

Different channels of the multichannel system may be divided with codes (CDMA, "Code Division Multiple Access"), in space (SDMA, "Space Division Multiple Access), in frequency (FDMA, "Frequency Division Multiple Access" or OFDMA), or intime (TDMA).

According to still another aspect of the invention, a probability for changing the channel may be determined according to the Backoff timer and the Contention Window variable. Channels may be divided with codes (CDMA), in space (SDMA), in frequency (FDMA) or time (TDMA).

According to a further aspect of the invention, an immediate repetition of the transmission of a collided packet may be carried out if the collided packet may be sent via a new channel which is identified as free, without previously waiting for a Backoff time. Again, channels may be divided with codes (CDMA), in space (SDMA), frequency (FDMA) or time (TDMA).

Next, preferred embodiments of the method of operating a network node of a network system will be described. These embodiments may also be applied for the network node, the network system, the computer-readable medium, and the program element of the invention.

According to the method, the signal to be transmitted may be a handshake signal for signalling an intention to subsequently transmit or receive a data signal. Such a handshake signal, which may be a Ready to Send signal (RTS), or a Clear to Send signal (CTS), may be transmitted between two network nodes between which a data transmission is intended, so that the participants of the data transmission event synchronize each other by a signalling message. Particularly, a Ready to Send signal (RTS) or a Clear to Send signal (CTS) give notice of an intention of subsequently sending or receiving a data signal.

Alternatively, the signal to be transmitted may be a data signal. Thus, it also falls under the scope of the invention that in case of a collision of a data signal to be transmitted over a selected channel, the data signal is retransmitted on another, i.e. a changed, transmission channel.

The network node may be adapted to communicate according to the IEEE 802.11 Standard (see LAN/MAN Standards Committee of the IEEE Computer Society, Wireless LAN Medium Access Control (MAN) and Physical Layer (PHY) specifications, IEEE standard 802.11, 1999 Edition). The IEEE 802.11 Standard is a standard that specifies carrier sense media access control and physical layer specifications for 1-, 2-, 11- and recently with 802.11g also 54-megabit-per-second (Mbps) wireless LANs operating in the 2.4-GHz band.

Further, the network node may be adapted to communicate according to the IEEE 802.11a Standard, being a worldwide standard for Wireless Local Area Networks (WLANs). The IEEE 802.11a Standard is a standard that specifies carrier sense media access control and physical layer specifications for wireless LANs operating in the 5-GHz frequency band.

Further, the network node may be adapted to communicate according to any other IEEE Standard developed by the numerous task groups and working groups of the 802 family of specifications including the upcoming IEEE 802.11n standard.

The network node may also be adapted to communicate according to the MBOA Medium Access Control specification for WPANs based on an Ultra Wide Band (UWB), rsp. Wideband Orthogonal Frequency Division Multiplexing (OFDM), Physical Layer.

According to the method of the invention, in case that the selected channel is not "ready" for transmitting the signal (e.g. a collision has occurred or the medium is busy, etc.), it may be determined whether another one of the plurality of communication channels shall be selected for transmitting the signal, or whether the transmission of the signal shall be delayed until the selected channel is ready for transmitting the signal. In other words, it is determined—in a scenario in which it is detected that the selected channel is occupied by other traffic at the moment—whether another channel is to be selected for a new attempt to transmit the signal, or whether, alternatively, the transmission of the signal shall be delayed for a (e.g. random) time after which it is expected that the previously selected channel is free again, such that the retransmission of the signal over this previously selected channel at a later time has a good chance to be successful.

Particularly, in case that the selected channel is not ready for transmitting the signal, it may be determined a probability (larger than zero and less or equal to one) of selecting another one of the plurality of communication channels for transmitting the signal, or alternatively to delay the transmission of the signal until the selected channel is ready for transmitting the signal. Thus, a statistical basis for a decision may be established by identifying probabilities reflecting if it is more reasonable to change the channel or to wait until the presently occupied selected channel is free again.

Such a probability may be determined based on a waiting time indicating a time the network node had to wait before transmitting the signal.

Particularly, this probability may be determined based on a Backoff time and a Contention Window, as defined in the above mentioned IEEE 802.11 Standard. The Backoff time may be denoted as a random time given as the product between the duration of one time slot and a random number uniquely distributed between zero and a Contention Window (CW). The Backoff time is the random length of time that a station waits before transmitting a packet. The Backoff time is a multiple of a slot time, so a decrease in the slot time ultimately decreases the Backoff time, which increases throughput. Thus, the Backoff time may be considered to be a waiting time, and the Contention Window can be considered to be a time window in which competing stations in a CSMA/CA system apply for an access to a channel.

Particularly, the probability may be determined as the quotient of the Backoff time and the Contention Window.

The Contention Window may be variable, i.e. the Contention Window may be changed (particularly enlarged) in case of a collision.

The method of the invention may further include the step of, in case that the selected channel is not ready for transmitting the signal, detecting whether another one of the plurality of communication channels of the network system is ready for transmitting the signal, and if another channel is ready, the signal is immediately transmitted over the channel being ready for transmitting the signal. According to this embodiment, an immediate repetition (i.e. without a delay) of the transmission of the collided packet is carried out, if a new channel is identified to be free, without previously waiting for a Backoff time. This embodiment significantly accelerates the transmission times and improves the transmission rates.

The method of the invention may further include the step of, in case that the selected channel is not ready for transmitting the signal, detecting which of the plurality of communication channels of the network are ready for transmitting the signal, and if more than one other channel is ready, it is randomly determined one of the channels being ready to transmit the signal. According to this embodiment, it is stochastically decided which of a plurality of free channels is used for transmitting the signal.

The method of the invention may further include the step of, in case of determining to delay the transmission of the signal until the selected channel is ready for transmitting the signal, retransmitting the signal over the selected channel after a delay time. Thus, if the decision is made to try to resend the signal again on the same channel on which the transmission has not been successful before, the method of the invention waits for a delay time, and after this delay time the signal is sent again.

The plurality of communication channels of the network may be distinguished in frequency, in space or with codes (eventually also in time). Thus, channels are separated with codes (CDMA, "Code Division Multiple Access"), in space (SDMA, "Space Division Multiple Access") or in frequency (FDMA, "Frequency Division Multiple Access" or OFDMA).

Particularly, the method of the invention may have implemented a Multi-Carrier Code Division Multiple Access function (MC-CDMA). A multi-carrier system is a system where several subcarriers are used for parallel transmission of data packets. According to the described embodiment, a multi-carrier mechanism may be applied to a Code Division Multiple Access (CDMA) network. In a Code Division Multiple Access (CDMA) network, each data symbol is spread over a larger bandwidth, preferably larger than the bandwidth needed for transmission. This allows to transmit with a spectral energy that is lower than in a non-spread spectrum system. This allows the use of parallel transmission channels, at the same time and in the same frequency band. Thus, a high capacity multi-carrier modulation technique can be implemented in a particularly advantageous manner with a standard Medium Access Control (MAC) protocol of the IEEE 802.11 WLAN.

In the following, an embodiment of the network node will be described. This embodiment also applies for the method, the network system, the computer-readable medium and the program element of the invention.

According to the described embodiment, the network node may be realized as a computer device, particularly as a personal computer, as a laptop computer, as a workstation, as a PDA ("Personal Digital Assistant"), or the like. However, the network node of the invention may also be realized as, for instance, a mobile phone, or the like.

In the following, an embodiment of the network system of the invention will be described. This embodiment also applies for the method, for the network node, for the computer-readable medium and for the program element of the invention.

The network system is preferably adapted for a wireless communication between the plurality of network nodes, thus forming a wireless network. Nodes of such a network may communicate with each other, for instance, via a transmission of electromagnetic waves. Particularly, such a network can be a WLAN (Wireless Local Area Network). However, alternatively, the network system of the invention may be conventionally wired, i.e. the different network nodes may be connected with each other using electrical wires.

The aspects defined above and further aspects of the invention are apparent from the examples of embodiment to be described hereinafter and are explained with reference to the examples of embodiment.

The invention will be described in more detail hereinafter with reference to examples of embodiment but to which the invention is not limited.

The illustration in the drawing is schematic. In different drawings, similar or identical elements are provided with the same reference signs.

In the following, referring to FIG. 1, a network system 100 according to a preferred embodiment of the invention will be described in detail.

Figure 1:
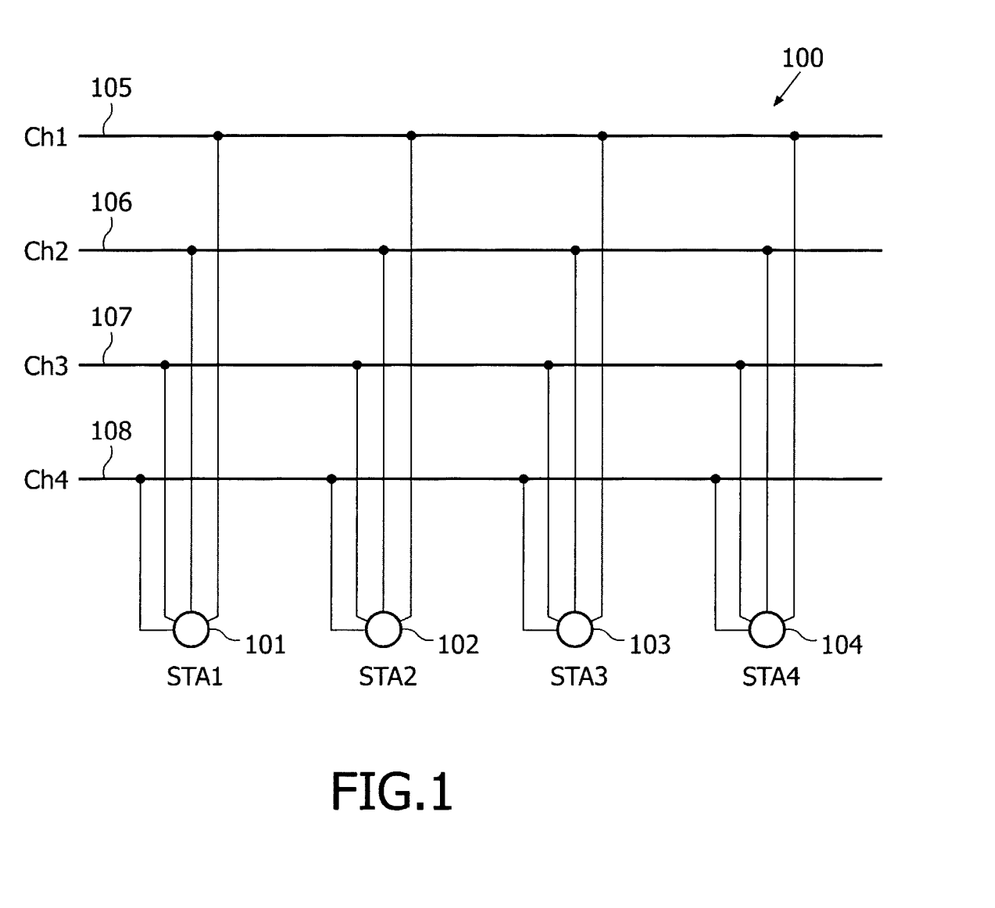
FIG. 1 shows a network system according to a preferred embodiment of the invention.

FIG. 1 shows the network system 100 comprising a first computer terminal 101, a second computer terminal 102, a third computer terminal 103 and a fourth computer terminal 104, each having a processor (not shown). The computer terminals 101 to 104 are interconnected in a wireless manner via a first channel 105, a second channel 106, a third channel 107 and a fourth channel 108. Via any of the channels 105 to 108, any of the computer terminals 101 to 104 can transmit data to any other of the computer terminals 101 to 104 in a wireless manner. Each of the computers 101 to 104 is adapted to communicate according to the IEEE 802.11 Standard, the network system 100 forming a WLAN. The communication may also be centralized and one of the terminals be a so-called Access Point, however the scenario will be described for a general decentralized case.

Each of the computer terminals 101 to 104 are network nodes within the network 100. Each of the computers 101 to 104 comprises a processor adapted to carry out the steps of generating a handshake signal (namely a Ready to Send signal (RTS) or a Clear to Send signal (CTS)) to signalize a potential receiver of the handshake signal that it is intended to send/receive a data signal subsequent to the handshake signal. Thus, each of the computers 101 to 104 may generate such a handshake signal. If one of the computers 101 to 104 wishes to transmit such a handshake signal, the respective computer selects one or more of the plurality of communication channels 105 to 108 of the network system 100 for transmitting the handshake signal. When one of the computers 101 to 104 sends such a handshake signal to another one of the computers 101 to 104, it may happen that one of the other computers 101 to 104 is starting to transmit at the same time resulting in a collision between the two transmissions on one or several of the communication channels 105 to 108. Instead of a collision one or several of the channels 105 to 108 may also simply be busy, which means that a transmission by one of the other computers 101 to 104 is already ongoing. In this latter case the medium is blocked and thus not ready for transmitting the handshake signal on the respective channels 105 to 108. Both examples would result in a transmission delay because the respective channel 105 to 108 could not be used immediately by the terminal Thus, according to the invention, the respective computer 101 to 104 detects that the selected channel has not been ready for transmitting the handshake signal and then determines a probability of selecting another one of the plurality of communication channels 105 to 108 for transmitting the handshake signal. Alternatively, with a probability of "one minus the probability of selecting another one of the plurality of communication channels 105 to 108 for transmitting the handshake signal", the respective computer 101 to 104 may delay the transmission of the handshake signal until the selected channel 105 to 108 is again ready for transmitting the signal, namely that the traffic which had previously occupied the selected one of the channels 105 to 108 has been transmitted in the mean time, so that the respective channel is ready again to transmit new traffic.

Figure 2:
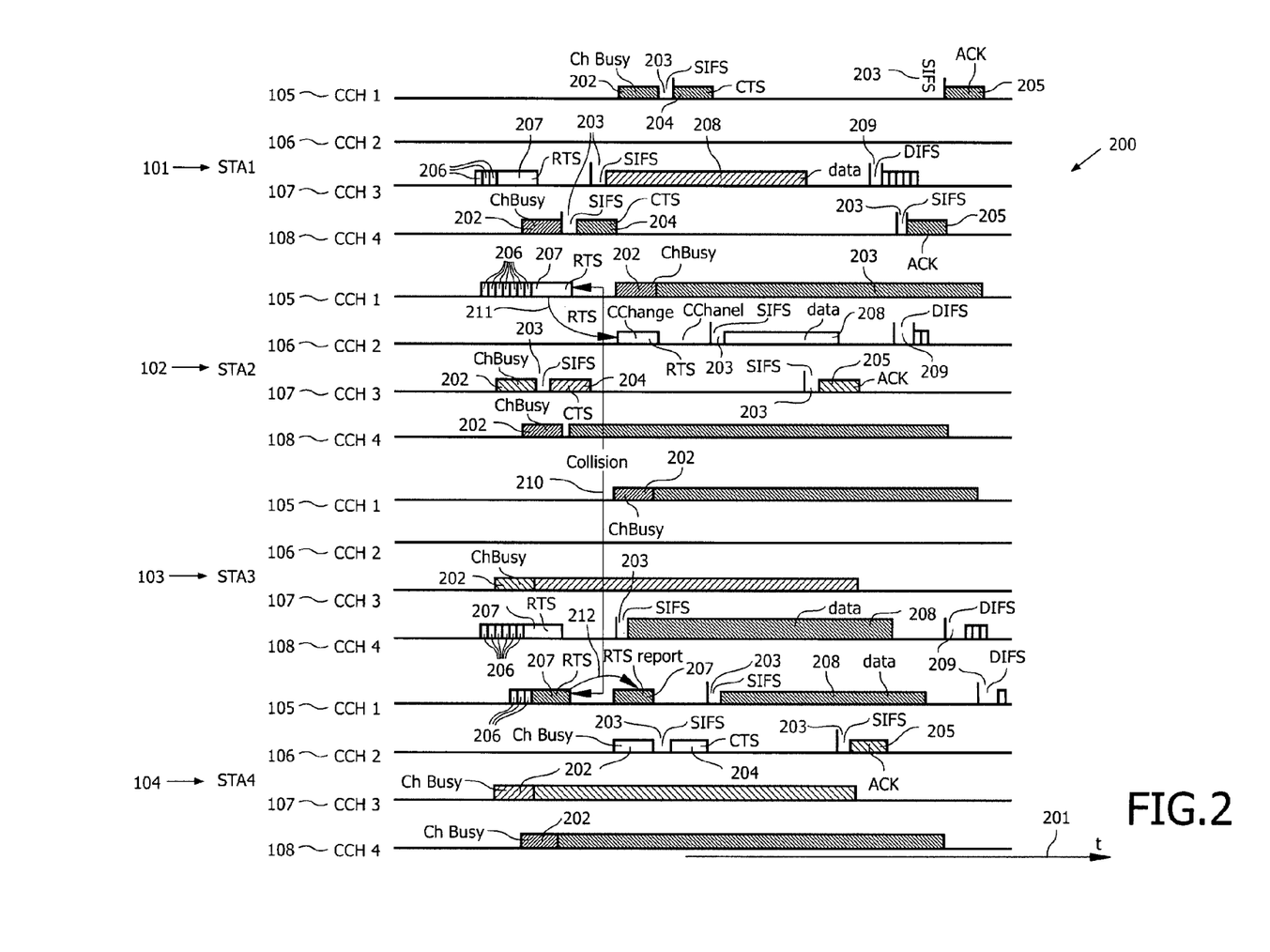
FIG. 2 shows the time dependence of traffic transmitted via different channels of the network system according to FIG. 1.

The probability of changing the channel to retransmit the handshake signal is determined, according to the described embodiment, as the quotient of a Backoff time and a Contention Window, as will be described in more detail referring to FIG. 2 below. However, the decision whether to re-try on different or the same channel(s) may also be deterministic. The plurality of communication channels 105 to 108 of the network 100 are distinguished by codes, namely having implemented a Multi-Carrier Code Division Multiple Access function (MC-CDMA).

In the following, a communication protocol according to an embodiment of the invention will be described in more detail referring to the traffic diagram 200 shown in FIG. 2.

The traffic diagram 200 shows, for each of the computers 101 to 104, traffic which is present at a time defined by the time axis 201 in any of the channels 105 to 108. The traffic on the channels 105 to 108 include, as shown in FIG. 2, Channel Busy times 202, Short Inter Frame Spacing (SIFS) time periods 203, Clear to Send (CTS) signals 204, Acknowledgement signals 205, time slots 206, Ready to Send (RTS) signals 207, data packets 208, DCF (Distributed Coordinate Function) Inter Frame Spacing (DIFS) time periods 209, etc.

In a communication system like a network system 100 using more than one channel 105 to 108 simultaneously, collisions are avoided with simultaneously achieving a high transmission rate, by sending a repeated RTS packet 212 on another channel. FIG. 2 shows an extended version of an IEEE 802.11a based network system 100 using the four channels 105 to 108. As can be seen in FIG. 2, a collision 210 occurs when both the second computer terminal 102 (STA2) and the fourth computer terminal 104 (STA4) try to send a RTS signal 207 using the same channel, namely the first channel 105 CCh1 at the same time, after a Backoff timer (see time slots 206) which for the two stations 102, 104 was different. In order to resolve the collision 210 of the RTS 207 signal transmission, the invention retransmits one of the two previously collided packets on another channel. As it is shown in FIG. 2, the second computer 102 STA2 performs a channel change 211 and repeats the RTS 207 (which failed to be transmitted on the first channel 105) on the second channel 106. In contrast to this, the fourth computer 104 STA4 makes a retry on the same channel 105 as used already beforehand, namely performs an RTS repeat 212.

According to the described embodiment, the channel change 211 involves two decisions. First, only one of the collided stations 102, 104 changes its selected channel from the first channel 105 to the second channel 106, and that happens according to the Backoff time a station has to wait before its transmission, as it is described in the standard IEEE 802.11. The Backoff time is a random time given as the product of the duration of one time slot 206 and a random number (ran_T) uniquely distributed between 0 and a Contention Window (CW). The definition of the variable CW is according to the IEEE 802.11 Standard.

The probability with which a station changes its channel is given as the quotient of the number of Backoff time slots ran_T and the actual value of the Contention Window (CW).

Referring once again to FIG. 2, the second computer 102 STA2 had waited for a Backoff timer of seven time slots 206 whereas the fourth computer 104 (namely STA4) had waited for a Backoff timer of three time slots 206. Assuming a Contention Window of seven for both stations 102, 104 (the previous data packets of both stations 102, 104 did not collide), the second computer 102 STA2 changes its channel from channel 105 to channel 106 with a probability of one, and the fourth computer 104 STA4 with a probability of 3/7.

A second important issue concerns the selection of a channel a station changes into after the decision was made to change its channel. The station should be aware of the status of the other channels, and if a channel is free it should immediately start its transmission on that, as is shown in FIG. 2 for the second computer 102 STA2 and for the second channel 106. In case of more free channels, the selection should be done randomly. In case the station can not be aware of the status of the other channels the decision on the new channel may be done randomly.

Figure 3:
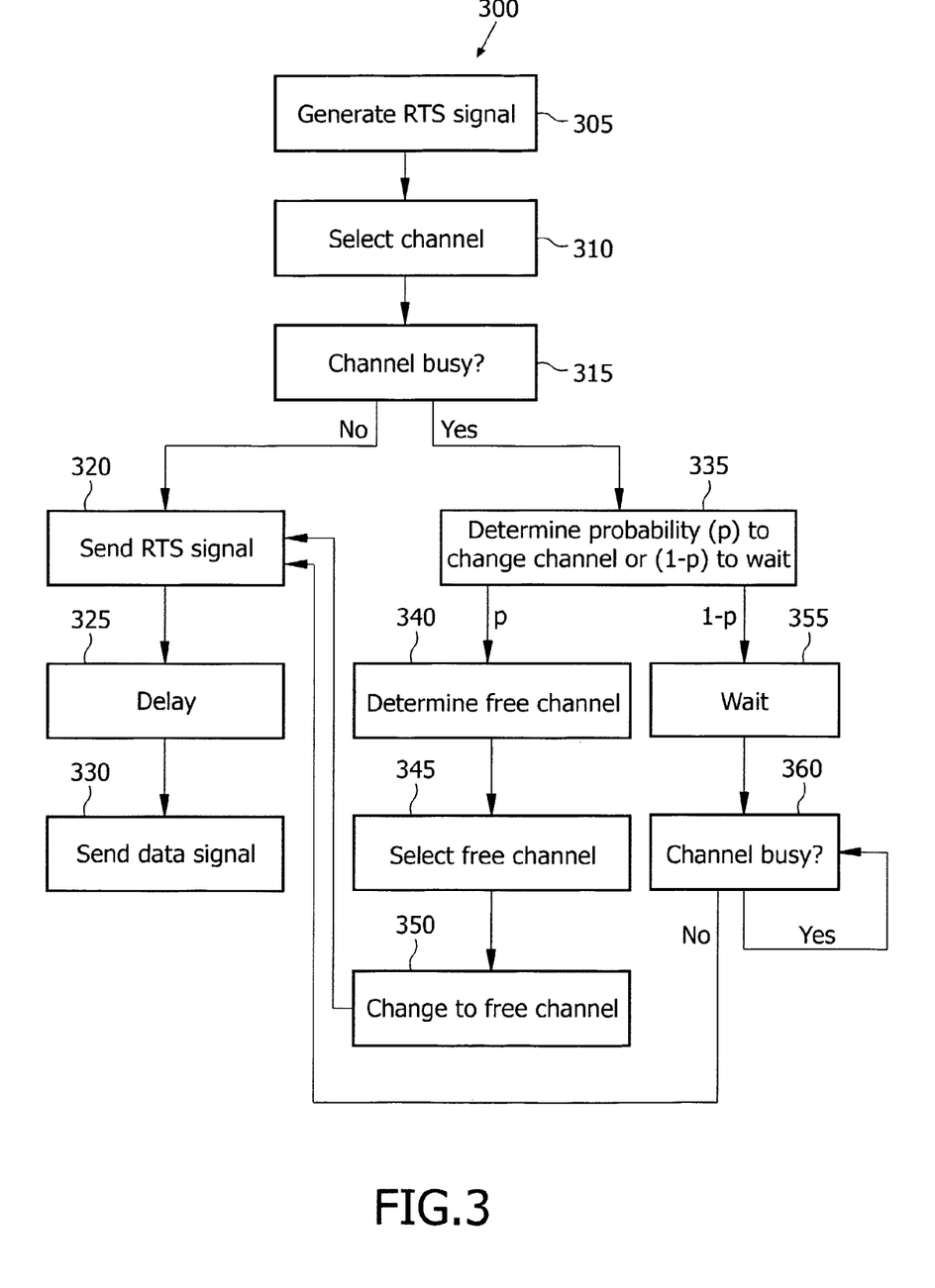
FIG. 3 shows a flow chart illustrating a method of operating a network node of a network system according to an embodiment of the invention.

In the following, referring to FIG. 3, a method 300 of operating any of the computers 101 to 104 of the network system 100 is described.

In a Generate step 305, an RTS signal is generated as a handshake signal indicating a desired subsequent transmission of a data signal. In a Select channel step 310, one of the channels 105 to 108 is selected as a channel for transmitting the generated handshake signal.

In a Channel busy query 315, it is detected whether the selected channel is presently busy.

If the channel is not busy, i.e. if the channel is free for a transmission of the generated handshake signal, in a Send RTS step 320, the generated RTS signal is sent by the respective computer 101 to 104. Then, in a Delay step 325, the respective computer 101 to 104 waits for a CTS signal and subsequently sends, in a Send data step 330, the data signal over the channel selected in step 310.

In case that the Channel busy query 315 yields as a result that the selected channel is busy at the moment, then a Determine channel change probability step 335 determines a probability, denoted as "p" (in the range between zero and one), to change the channel. With a probability of "(1–p)", the computer waits.

With the probability of p, it is determined in a Determine free channel step 340, which of the remaining channels is free and is thus suitable for a transfer of the generated RTS signal. If such a free channel is found, the free channel is selected in a Select free channel step 345. In a Change to free channel step 350, the respective computer changes to a free channel, and then performs steps 320, 325, 330, as mentioned above, to send the data signal via the determined free channel.

With the probability of (1–p), the respective computer 101 to 104 waits in a Wait step 355 for a predetermined time or for a random time, and then checks in a Channel busy query 360 whether the channel which had previously been selected is still busy, or is now free.

If the channel is now free, the computer continues with steps 320, 325, 330 and sends the generated handshake signal over the previously selected channel. If the previously selected channel is still busy, step 360 is repeated, until the channel is free.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE SIGNS 100 network system
101 first computer terminal
102 second computer terminal
103 third computer terminal
104 forth computer terminal
105 first channel
106 second channel
107 third channel
108 forth channel
200 traffic diagram
201 time axis
202 Channel Busy packet
203 Short Inter Frame Spacing (SIFS)
204 Clear to Send (CTS) signal
205 Acknowledgement signal
206 time slots
207 Ready to Send (RTS) signal
208 data packet
209 DCF (Distributed Coordinate Function) Inter Frame Spacing (DIFS)
210 Collision
211 channel change
212 RTS repeat
300 method
305 Generate step
310 Select channel step
315 Channel busy query
320 Send RTS step
325 Delay step
330 Send data step
335 Determine channel change probability step
340 Determine free channel step
345 Select free channel step
350 Change step
355 Wait step
360 Channel busy query

The invention claimed is:

1. A method of operating a network node of a network system comprising:
generating a signal to be transmitted;
selecting, by the network node, one of a plurality of communication channels of the network system for transmitting the signal;
in case that the selected channel is not ready for transmitting the signal, determining, by the network node, whether to select another one of the plurality of communication channels for transmitting the signal, or whether to delay the transmission of the signal until the selected channel is ready for transmitting the signal.

2. The method according to claim 1, wherein the signal to be transmitted is a handshake signal for signalling purposes for channel reservation prior to transmitting or receiving a data signal.

3. The method according to claim 2, in which the handshake signal is a Ready to Send signal or is a Clear to Send signal.

4. The method according to claim 2, in which the handshake signal is a signal that includes additional information regarding multiple antenna training and data rate feedback.

5. The method according to claim 1, wherein the signal to be transmitted is a data signal.

6. The method according to claim 1, wherein the network node is configured to communicate according to the IEEE 802.11 series of standards.

7. The method according to claim 1, wherein the network node is configured to communicate according to the IEEE 802.11a, 802.11g, 802.11n or any other 802.11 sub-standard.

8. The method according to claim 1, wherein the network node is configured to communicate according to the Multi Band OFDM Alliance Medium Access Control standard.

9. The method according to claim 1, wherein, in case that the selected channel is not ready for transmitting the signal, determining, by the network node, a probability of selecting another one of the plurality of communication channels for transmitting the signal, or alternatively delaying the transmission of the signal until the selected channel is ready for transmitting the signal.

10. The method according to claim 9, wherein the probability is determined based on a waiting time indicating a time the network node had to wait before transmitting the signal.

11. The method according to claim 9, wherein the probability is determined based on a Backoff time and based on a Contention Window.

12. The method according to claim 9, wherein the probability is determined as the quotient of a Backoff time and a Contention Window.

13. The method according to claim 12, wherein the Contention Window is variable.

14. The method according to claim 1,
further including in case that the selected channel is not ready for transmitting the signal, detecting, by the network node, whether another one of the plurality of communication channels of the network system is ready for transmitting the signal, and if another channel is ready, immediately transmitting the signal over the channel being ready for transmitting the signal.

15. The method according to claim 1,
further including in case that the selected channel is not ready for transmitting the signal, detecting, by the network node, which of the plurality of communication channels of the network are ready for transmitting the signal, and if more than one other channels is ready, randomly determining one or more of the channels being ready to transmit the signal.

16. The method according to claim 1,
further including in case of determining to delay the transmission of the signal until the selected channel is ready for transmitting the signal, retransmitting the signal over the selected channel after a delay time.

17. The method according to claim 1, wherein the plurality of communication channels of the network are distinguished by different frequencies or by different codes or by different antennas or antenna-sectors or by different time slots.

18. The method according to claim 1, having implemented a Multi-Carrier Code Division Multiple Access function.

19. The method according to claim 1, wherein the selected channel is not ready, since the signal was not successfully transmitted before, particularly due to a collision, and the selecting another one of the plurality of communication channels for transmitting the signal is carried out after the unsuccessful transmission prior to the next transmission attempt.

20. The method according to claim 1, wherein the selected channel is not ready, since the channel is busy by a transmission of another network node, and the selecting another one of the plurality of communication channels for transmitting the signal is carried out after the channel has been detected as busy prior to any transmission attempt.

21. A network node, comprising:
generating means for generating a signal to be transmitted;
selecting means for selecting one of a plurality of communication channels of a network system, in which the network node is interconnected, for transmitting the signal;
in case that the selected channel is not ready for transmitting the signal, means for determining whether to select another one of the plurality of communication channels for transmitting the signal, or whether to delay the transmission of the signal until the selected channel is ready for transmitting the signal.

22. The network node according to claim 21, realized as a computer device.

23. A network system, comprising a plurality of interconnected network nodes according to claim 22.

24. The network system according to claim 23, configured for wireless communication between the plurality of network nodes.

25. A non-transitory computer-readable storage medium, in which a computer program of operating a network node of a network system is stored which, when being executed by a processor, is configured to carry out the following:
generating a signal to be transmitted;
selecting one of a plurality of communication channels of the network system for transmitting the signal;
in case that the selected channel is not ready for transmitting the signal, determining whether to select another one of the plurality of communication channels for transmitting the signal, or whether to delay the transmission of the signal until the selected channel is ready for transmitting the signal.

26. A network node of a network system comprising:
a processor configured for
generating a signal to be transmitted;
selecting one of a plurality of communication channels of the network system for transmitting the signal; and
in case that the selected channel is not ready for transmitting the signal, determining whether to select another one of the plurality of communication channels for transmitting the signal, or whether to delay the transmission of the signal until the selected channel is ready for transmitting the signal; and
a computer readable storage medium.

* * * * *